United States Patent [19]

Ohe et al.

[11] Patent Number: 4,821,042

[45] Date of Patent: Apr. 11, 1989

[54] VEHICLE ANTENNA SYSTEM

[75] Inventors: Junzo Ohe, Toyota; Hiroshi Kondo, Okazaki, both of Japan

[73] Assignee: Toyota Jidosha Kabushiki Kaisha, Toyota, Japan

[21] Appl. No.: 878,778

[22] Filed: Jun. 26, 1986

[30] Foreign Application Priority Data

Jun. 28, 1985 [JP] Japan ................................ 60-143090
Jun. 28, 1985 [JP] Japan ................................ 60-143093

[51] Int. Cl.⁴ ............................................. H01Q 1/32
[52] U.S. Cl. .................................... 343/712; 343/713; 343/855
[58] Field of Search ............... 343/711, 712, 713, 855, 343/876, 893, 742, 867; 455/277, 274, 297, 275

[56]  References Cited

U.S. PATENT DOCUMENTS

| | | | |
|---|---|---|---|
| 2,200,674 | 5/1940 | McDonald | 343/866 |
| 2,212,253 | 8/1940 | Stief | 343/713 |
| 2,404,093 | 7/1946 | Roberts | 343/705 |
| 2,481,978 | 9/1949 | Clough | 343/712 |
| 2,520,986 | 9/1950 | Williams et al. | 343/712 |
| 2,575,471 | 11/1951 | Schweiss et al. | 343/712 |

(List continued on next page.)

FOREIGN PATENT DOCUMENTS

| | | |
|---|---|---|
| 181120 | 5/1986 | European Pat. Off. . |
| 181200 | 5/1986 | European Pat. Off. . |
| 181765 | 5/1986 | European Pat. Off. . |
| 183523 | 6/1986 | European Pat. Off. . |
| 889618 | 9/1953 | Fed. Rep. of Germany . |
| 1131762 | 6/1962 | Fed. Rep. of Germany . |
| 1949828 | 4/1970 | Fed. Rep. of Germany . |
| 7015306 | 9/1970 | Fed. Rep. of Germany . |
| 2425189 | 12/1975 | Fed. Rep. of Germany . |
| 2701921 | 7/1978 | Fed. Rep. of Germany . |
| 2733478 | 2/1979 | Fed. Rep. of Germany . |
| 2745475 | 4/1979 | Fed. Rep. of Germany ...... 343/712 |
| 2821202 | 11/1979 | Fed. Rep. of Germany . |
| 53-22418 | 7/1978 | Japan . |
| 53-34826 | 8/1978 | Japan . |
| 55-46617 | 4/1980 | Japan ................................ 343/712 |
| 59-44861 | 3/1984 | Japan . |
| 129464 | 8/1985 | Japan . |
| 60-175221 | 10/1985 | Japan . |

OTHER PUBLICATIONS

Japanese Pat. Abstract, vol. 6, No. 37, E-97, 3/6/82, 56-156031.
Japanese Pat. Abstract, vol. 6, No. 55, E-101, 4/10/82, 56-168441.
Japanese Pat. Abstract, vol. 7, No. 162, E-187, 7/15/83, 58-070640.
Japanese Pat. Abstract, vol. 7, No. 162, E-187, 7/15/83, 58-070642.
Japanese Abstract 59-57503, dated 4/3/84, vol. 8, No. 155.
Japanese Abstract 59-44132, dated 3/12/84, vol. 8, No. 135.
"Multipath Reception in FM Car Radio Receivers and Antenna Diversity by Means of a Distortion Detector", by Lindenmeir and Reiter, dated 1983, pp. 187–190, Germany.

*Primary Examiner*—William L. Sikes
*Assistant Examiner*—Michael C. Wimer
*Attorney, Agent, or Firm*—Cushman, Darby & Cushman

[57]  ABSTRACT

The present invention provides a vehicle antenna system including high frequency pickup type antennas concealed within the vehicle body for receiving broadcast waves. The high frequency pickups are arranged on the vehicle body at locations spaced apart from one another, that is, at least one adjacent to the vehicle roof and the other on a trunk hinge. The antenna system also includes a diversity circuit for automatically selecting one of the high frequency pickups which is in its optimum state of reception. Each of the high frequency pickups is disposed near the marginal portion of the vehicle body such that surface high frequency currents concentratedly induced on the marginal portion of the vehicle body can be detected by the high frequency pickup. Each of the high frequency pickups includes a loop antenna or electrostatic electrode disposed near the marginal portion of the vehicle body.

8 Claims, 14 Drawing Sheets

U.S. PATENT DOCUMENTS

| | | | |
|---|---|---|---|
| 2,740,113 | 3/1956 | Hemphill | 343/787 |
| 2,774,811 | 12/1956 | Shanok et al. | 343/712 |
| 2,859,441 | 11/1958 | Rosenbaum | 343/712 |
| 2,950,479 | 8/1960 | Pan | 343/702 |
| 2,971,191 | 2/1961 | Davis | 343/712 |
| 3,007,164 | 10/1961 | Davis | 343/712 |
| 3,066,293 | 11/1962 | Davis | 343/712 |
| 3,210,766 | 10/1965 | Parker | 343/712 |
| 3,364,487 | 1/1968 | Maheux | 343/702 |
| 3,611,388 | 10/1971 | Okumura | 343/712 |
| 3,717,876 | 2/1973 | Volkers et al. | 343/712 |
| 3,728,732 | 4/1973 | Igarashi | 343/713 |
| 3,742,508 | 6/1973 | Tomaszewski | 343/713 |
| 3,794,997 | 2/1974 | Iwatsuki et al. | 343/712 |
| 3,823,403 | 7/1974 | Walter et al. | 343/708 |
| 3,916,413 | 10/1975 | Davis | 343/712 |
| 3,961,292 | 6/1976 | Davis | 343/712 |
| 3,961,330 | 6/1976 | Davis | 343/712 |
| 3,972,048 | 7/1976 | Davis | 343/712 |
| 4,003,056 | 1/1977 | Davis | 343/704 |
| 4,080,603 | 3/1978 | Moody | 343/712 |
| 4,217,591 | 8/1980 | Czerwinski | 343/713 |
| 4,278,980 | 7/1981 | Ogita et al. | 343/748 |
| 4,317,121 | 2/1982 | Allen et al. | 343/712 |
| 4,339,827 | 7/1982 | Torres et al. | 343/748 |
| 4,499,606 | 2/1985 | Rambo | 455/277 |
| 4,506,267 | 3/1985 | Harmuth | 343/744 |
| 4,566,133 | 1/1986 | Rambo | 455/277 |
| 4,633,519 | 12/1986 | Gotoh et al. | 455/277 |

FIG. 16
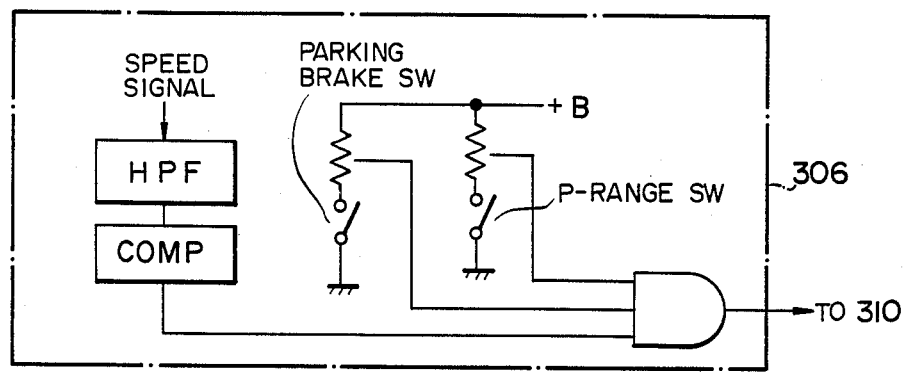
FIG. 17
(A) 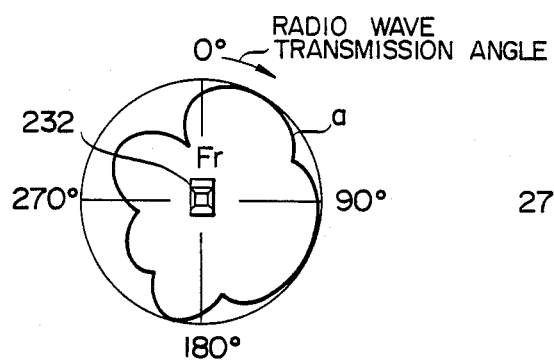
(B) 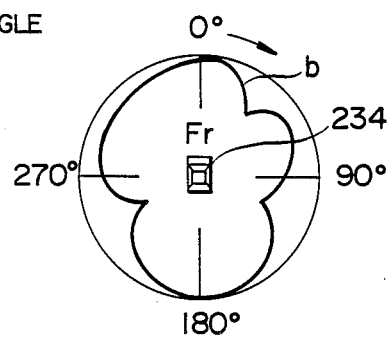

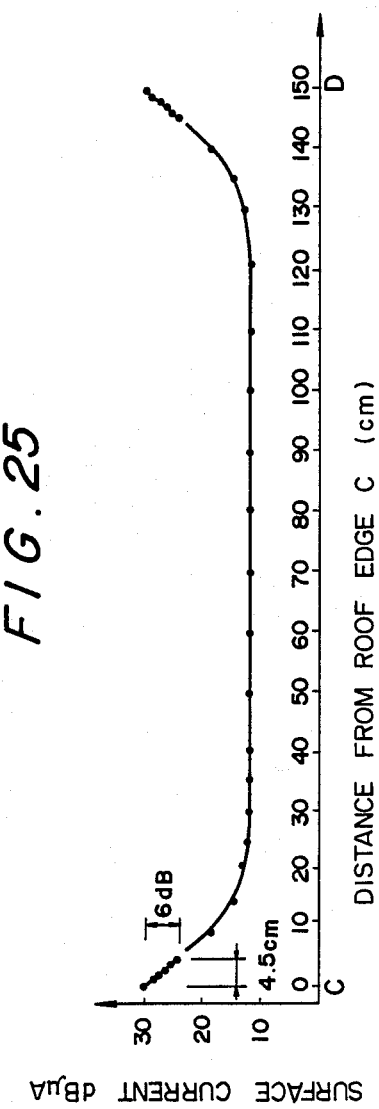
FIG. 25
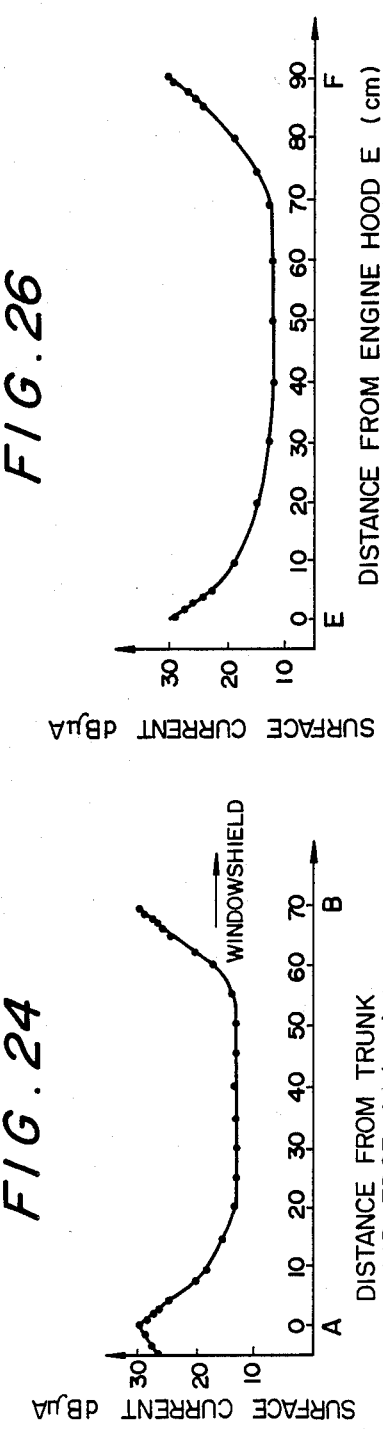
FIG. 26
FIG. 24

VEHICLE ANTENNA SYSTEM

BACKGROUND OF THE INVENTION

1. Field of the Invention

The present invention relates to a vehicle antenna system and particularly to an improved vehicle antenna system which can efficiently detect broadcast waves received by the vehicle body and deliver the detected signals to various receivers on board the vehicle.

2. Description of the Prior Art

Antenna systems are essential in vehicles for positively receiving various broadcast waves such as radio and TV waves, and communication waves such as car-telephone waves. A vehicle antenna system also is very important for a citizen band transceiver which effects communication between a vehicle and another stationary or moving station. Such vehicle antenna systems are anticipated to perform very important functions with communication instruments to be standardly mounted in future vehicles.

In the prior art, a generally used and known antenna system is the pole type antenna system which extends outwardly from the vehicle body and which provides favorable reception performance in its own way. However, the pole type antenna is nothing less than an obstacle vehicle design.

Furthermore, the pole type antenna is frequently bent or damaged intentionally or carelessly. In addition, the pole antenna tends to produce unpleasant noises when a vehicle on which the pole antenna is mounted runs at high speeds. For these reasons, it has been largely desired to omit the pole type antenna from the vehicle.

Recently, there have been allocated additional frequency bands for broadcast or communication waves which are to be received by vehicle receivers. A plurality of antenna systems are required to receive waves in the respective frequency bands. This further damages the aesthetic appearance of the vehicle. Moreover, the plurality of antenna systems produces an electric interference between antennas thereby degrading reception.

Some efforts have been made to remove or conceal the pole type antenna. For example, an antenna wire is applied to the rear window glass of a vehicle.

Another proposal has been made to detect surface currents induced by receiving broadcast waves at the body of a vehicle. This apparently should provide the most positive end efficient means for receiving broadcast waves. However, experiments have indicated that such a proposal was not as superior as was expected.

A first problem produced when the surface currents are to be used to receive broadcast waves at vehicle receivers is that the surface currents are not as strong as expected. In the prior art, the surface currents are mainly utilized at the front roof of the vehicle body. In spite of this, no sufficient signal level could be obtained to utilize the surface currents.

A second problem is that the surface currents include noises at a very large rate. Such noises are mainly produced by the ignition system and charging regulator system of a vehicle engine and thus cannot be removed as long as the engine runs. Therefore, the clear reception of broadcast waves could not be realized at all.

Under such disadvantageous conditions, some other proposals have been made. For example, Japanese Patent Publication 53-22418 discloses an antenna system utilizing currents which are induced on the body of a vehicle. The antenna system comprises an electric insulation provided at a portion of the vehicle body in which currents are concentrated. The antenna system also comprises a sensor for directly detecting the currents between the opposite ends of the electric insulation. In such an arrangement, it is sure that the antenna system can detect practicable signals which are superior in S/N ratio. However, the antenna system requires a pickup structure which must be disposed in a notch intentionally formed on a portion of the vehicle body. This proposal cannot be applied to mass-production vehicles.

Japanese Utility Model Publication 53-34826 discloses another antenna system comprising pickup coil means for detecting currents on the pillar of a vehicle. This antenna system is disadvantageous in that it can completely be contained within the vehicle body. However, the antenna system requires an undesirable arrangement wherein the pickup coil must be disposed near the pillar in a direction perpendicular to the longitudinal extent thereof. Moreover, such an arrangement cannot obtain any practicable antenna output and is therefore at best a poorly conceived idea.

As can be seen from the foregoing, the prior art does not provide any proper construction and arrangement of a pickup device which are required to effect the efficient detection of currents flowing on the vehicle body and to obtain a practicable S/N ratio. Rather, experiments show that the antenna system utilizing currents on the vehicle body is probably ineffective in principle.

Recently, TV sets are increasingly being mounted on vehicles not only to receive TV waves but also to display various data relating to the vehicles. In such vehicle TV sets, TV wave signals are separated into image signals and voice signals. When the vehicle is at zero speed, both the image and voice signals are used in the TV set. When the vehicle runs at speeds above a predetermined level, only the voice signals are outputted from the TV set.

Such vehicle TV sets have a problem in that the quality of the image can be reduced since the state of reception is changed depending on the condition of the vehicle.

In order to overcome such a problem, the prior art vehicle TV set comprises a plurality of TV antennas controlled by a diversity receiving system which can select optimum TV antennas depending on the state of reception.

In such a case, a plurality of TV antennas are disposed on the body of a vehicle at various preselected locations. The diversity receiving system is electrically connected with the TV antennas such that they can selectively be used depending on the state of reception for image signals separated from received signals. The diversity receiving system is adapted to compare the image signal level with a reference level in synchronism with the vertical blanking interval of the image signals to select optimum TV antennas.

The diversity receiving system also has a problem in that the construction and arrangement of a pickup device required to efficiently detect currents induced by TV waves at the vehicle body and also to obtain a practicable S/N ratio cannot properly be established. Particularly, a high frequency pickup used as a TV antenna does not have a good high frequency directional pattern. And yet, multi-path noises tend to be produced during reception of FM waves having a high frequency belonging to the VHF band.

SUMMARY OF THE INVENTION

In view of the above problems, it is an object of the present invention to provide an antenna system for small-size vehicles, which can efficiently detect currents induced on the body of a vehicle by receiving broadcast waves for use in vehicle receivers.

Another object of the present invention is to provide a vehicle antenna system comprising a diversity receiving system which can efficiently detect currents induced on the body of a vehicle by broadcast waves for use in vehicle deliver vehicle-laden TV set means.

The prior art antenna systems were intended mainly to receive AM waves. This resulted in a reduced characteristic of reception since the wavelength of broadcast waves to be received is too long. The inventors aimed at this dependency of frequency and normally utilized broadcast waves having a frequency equal to or higher than 50 MHz as waves to be received according to the present invention, such a frequency being higher than AM frequency. As a result, reception of signals can very efficiently be made from currents on the vehicle body.

The inventors also aimed at the fact that such currents are distributed on a vehicle body in various locations at different rates. The present invention is thus characterized in that at least one high frequency pickup is provided on the vehicle body at a location wherein currents are concentratedly induced by broadcast waves with less noises. In preferred embodiments of the present invention, such a location is determined on a trunk hinge or roof of the vehicle body.

In a preferred embodiment, an antenna system of the present invention comprises a first high frequency pickup disposed on a trunk hinge of the vehicle body along the length thereof, a second high frequency pickup arranged on a portion of the marginal edge of the vehicle roof on the same side of the vehicle body as the first pickup, and a space diversity receiving system for selectively delivering received signals from one of the first and second high frequency pickups.

Where body the first and second high frequency pickups are disposed on the vehicle body at the right-hand side thereof, the first high frequency pickup will have an FM band directional pattern having a rightward and forward dip and a lateral dip while the second high frequency pickup will have a directional pattern having a high sensitivity relative to the dips in the first pickup.

On the contrary, where both the first and second pickups are located on the left-hand side of the vehicle body, the first pickup will have a leftward and forward dip and a lateral dip while the second pickup will have a directional pattern having a high sensitivity relative to the dips in the first pickup.

In such a manner, the FM band directional patterns of the first and second high frequency pickups complement one another with respect to the dips. Furthermore, signals to be received are selectively delivered to one of the high frequency pickups to provide a good space diversity effect since the pickups are spaced away from each other along the length of the vehicle body.

In order to provide an efficient detection, each of the high frequency pickups may be in the form of a loop antenna which electromagnetically detects magnetic flux induced by currents on the vehicle body or an electrode type antenna which can electrostatically detect high frequency signals through an electrostatic capacity formed between the loop antenna and the vehicle body.

In another preferred embodiment, an antenna system of the present invention comprises a high frequency roof pickup applied to a vehicle of such a type that it includes an edge molding mounting retainer separated from a marginal roof plate, for example, a rear window frame or an inner header panel. The retainer has a length which easily causes surface currents flowing on the marginal portions of the vehicle body to resonate with a frequency equal to or higher than 50 MHz. Namely, the length of the retainer is designed to be substantially equal to the wavelength of TV bands.

In order to increase the concentration of currents, it is preferred that the retainer is spaced apart from the marginal roof plate, that is, the rear window frame or inner header panel by a distance equal to about $2 \times 10^{-3} \times$ wavelength. The high frequency roof pickup includes a loop antenna which is disposed near said edge molding mounting retainer along the length thereof.

The antenna system of the present invention also comprises a high frequency pickup disposed near a trunk hinge of the vehicle body along the length thereof.

In such an arrangement, the roof and trunk-hinge pickups can complement each other with respect to their sensitivities in the characteristic or directional pattern of the antenna system which picks up surface high frequency currents induced on the vehicle body by broadcast waves. The entire sensitivity of the antenna system can further be improved by increasing the number of the roof and trunk-hinge high frequency pickups.

BRIEF DESCRIPTION OF THE DRAWINGS

FIG. 16 is a diagram of the details of the drive state discriminating circuit shown in FIG. 15.

FIGS. 17A and 17B illustrate directional patterns of the high frequency roof and trunk-hinge pickups in TV bands, respectively.

FIGS. 24, 25 and 26 are graphs showing the distributions of surface currents on the vehicle body along various sections shown in FIG. 22.

DETAILED DESCRIPTION OF PREFERRED EMBODIMENTS

Location of High Frequency Pickup

Referring first to FIGS. 18-23, there is illustrated a process of measuring the distribution of high frequency currents and determining the most efficient location at which an antenna system according to the present invention can preferably be mounted on the body of a vehicle.

Figure 18:
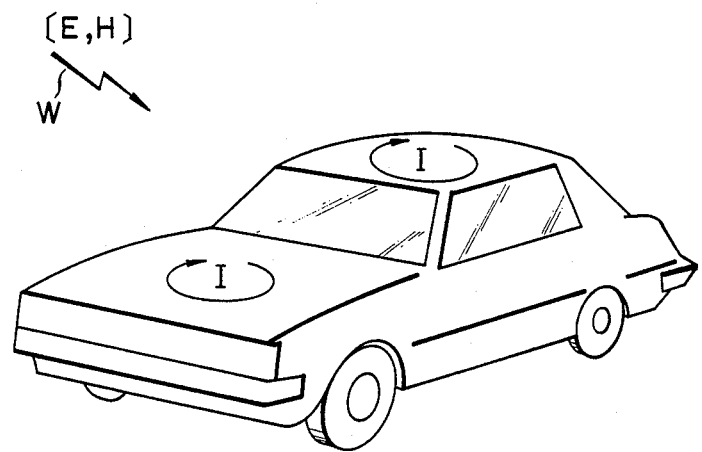
FIG. 18 illustrates surface currents I induced on the vehicle body B by external waves W.

FIG. 18 shows the fact that when external waves W such as broadcast waves pass through the vehicle body of conductive metal material, surface currents I are induced on the vehicle body at various locations depending on the intensity of the external waves W. The present invention intends to utilize only waves having a frequency equal to and higher than 50 MHz and belonging to relatively high frequency bands such as FM bands, TV bands and others.

In accordance with the present invention, an antenna system is characterized by pickup means for such particular high frequency bands, which is disposed on the vehicle body at a location which is determined by measuring the distribution of surface currents induced on the vehicle body and in which the surface currents are concentratedly induced with less noise.

The distribution of surface currents is determined by actually measuring intensities of current on the vehicle body at various locations and by using a computer simulation. The present invention utilizes a probe constructed in accordance with the same principle as that of a high frequency pickup means which is to be disposed on the vehicle body, as will be described. The probe is moved through the entire surface area of the vehicle body while changing its orientation at each location. Thus, the surface currents can exactly be measured on the vehicle body throughout the surface area thereof.

Figure 19:
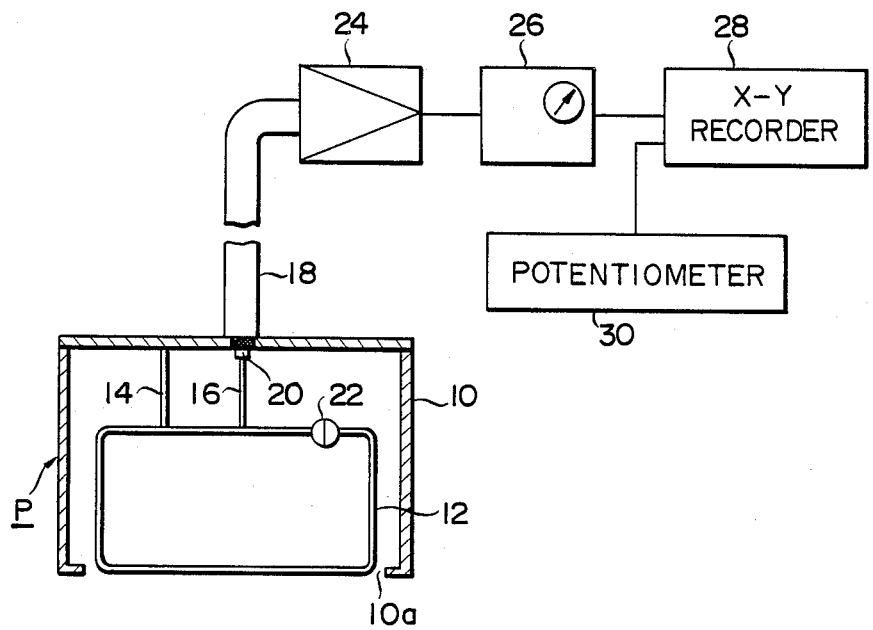
FIG. 19 is a block diagram showing a probe and associated processing circuit for determining the distribution of the surface currents on the vehicle body, the probe having the same construction as that of a high frequency pickup according to the present invention.

Referring to FIG. 19, there is shown a probe P comprising a casing 10 of a conductive material for preventing the influence of external waves and a loop coil 12 located within the casing 10. The casing 10 is provided with an opening 10a through which a portion of the loop coil 12 is exposed externally. The exposed portion of the loop coil 12 is positioned close to the surface of the vehicle body B such that a magnetic flux induced by the surface currents on the vehicle body can be detected by the loop coil 12. The loop coil 12 is electrically connected with the casing 10 through a short-circuiting line 14. The loop coil 12 includes a capacitor 22 which functions to resonate the frequency of the loop coil 12 with a frequency to be measured for an improved pickup efficiency.

When the probe P is moved along the surface of the vehicle body B and angularly rotated at each point of measurement, the distribution and orientation of the surface currents can be exactly determined on the vehicle body. Referring again to FIG. 19, the output of the probe P is amplified by a high frequency voltage amplifier 24 the output voltage of which in turn is displayed by a high frequency voltage meter 26 and at the same time recorded by an XY recorder 28 as a surface current value on the vehicle body at the respective one of various locations. The XY recorder 28 also receives a signal indicative of the corresponding location on the vehicle body from a potentiometer 30. Thus, the distribution of surface currents on the vehicle body can be determined at the XY recorder 28.

Figure 20:
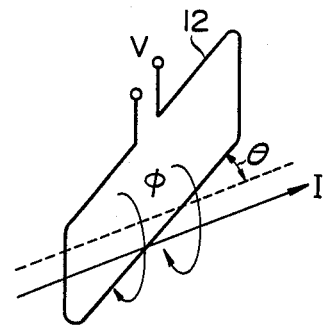
FIG. 20 illustrates an electromagnetic coupling between the surface currents I and the pickup loop antenna.
Figure 21:
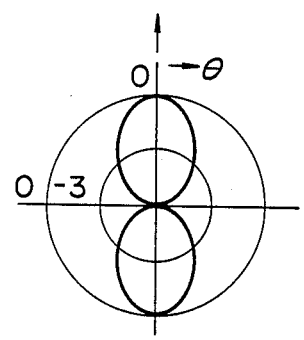
FIG. 21 illustrates the directional pattern of the loop antenna shown in FIG. 20.

FIG. 20 shows a declination angle $\theta$ between the surface high frequency currents I and the loop coil 12 of the probe P. As shown, a magnetic flux $\phi$ induced by the surface currents I intersects the loop coil 12 to provide a voltage V to be detected at the loop coil 12. As can be seen from FIG. 21, the maximum voltage is provided when the declination angle $\theta$ is equal to zero, that is, when the surface currents I are parallel to the loop coil 12 of the probe. When the maximum voltage is obtained by rotating the probe P at each point of measurement, the orientation of the surface currents I can be known at that point of measurement.

Figure 22:
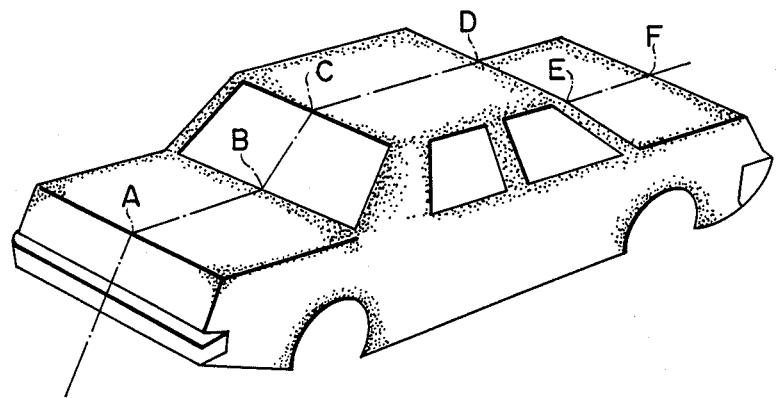
FIG. 22 illustrates the distribution of surface currents on the vehicle body.
Figure 23:
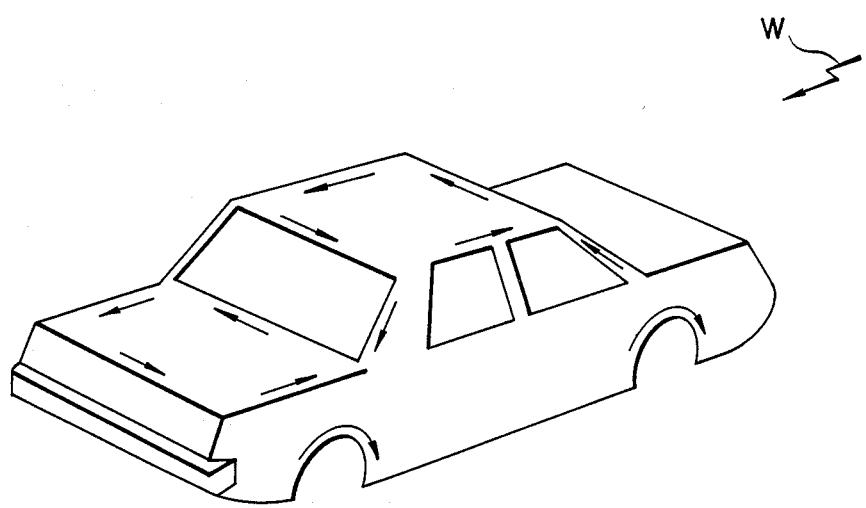
FIG. 23 illustrates the directions of the surface currents flowing on the vehicle body.

FIGS. 22 and 23 show the magnitude and orientation of the surface high frequency currents produced on the vehicle body at the respective locations by external waves having a frequency equal to 80 MHz, the magnitude and orientation of the surface currents being determined from the actual operation of the probe P and by the use of a computer simulation. A seen from FIG. 22, the magnitude of the surface currents becomes maximum at the marginal portions of the flat panels of the vehicle body and minimum at the central portions of these flat panels.

As seen from FIG. 23, it is further understood that the surface currents are concentratedly induced in the direction parallel to each of the marginal edges of the vehicle body or along the connection between each adjacent flat panels.

Further, by studying the distribution of the surface currents induced on the vehicle body along the longitudinal axis shown by the dotted line in FIG. 22, there are found such sectional distributions as shown in FIGS. 24-26.

FIG. 24 shows a sectional distribution of surface currents along a longitudinal section A-B on the trunk lid. As seen from this graph, the surface currents are maximum at the opposite ends. It is therefore understood that if a high frequency pickup is disposed at a portion of the margin of the trunk lid, for example, along one of the trunk hinges, the concentrated currents can effectively be detected.

FIG. 25 shows a sectional distribution of surface currents along the front roof of the vehicle body and also FIG. 26 shows a sectional distribution of surface currents along the engine hood of the vehicle body. It is similarly understood that the magnitude of the surface currents becomes maximum at the opposite ends of the front roof or engine hood.

It is thus apparent that good sensitivity can be provided if the high frequency pickup according to the present invention is disposed on the vehicle body near one of the respective margins thereof.

Of course the high frequency pickup of the present invention may similarly be applied to a pillar or fender in place of the trunk hinge and front roof.

When the high frequency pickup of the present invention is located near the marginal edge of the vehicle body, for example, such that the length of the loop antenna extends parallel to the length of the marginal edge, it is preferred that the pickup is spaced apart from the marginal edge within a range depending on the carrier frequency of broadcast waves to be provided to provided a very good practicable sensitivity.

As was described hereinbefore, the sectional distributions of surface currents shown in FIGS. 24-26 are for FM broadcast waves having a frequency equal to 80 MHz. The magnitude of the surface currents decreases as the distance from the marginal edge of the vehicle body increases. Considering that a lower limit of 6 dB or less is a good sensitivity which can actually be provided, it is understood from FIGS. 24-26 that if the distance from the marginal vehicle edge is within 4.5 cm, very good sensitivity can be obtained.

Therefore, the antenna system will have a sufficient performance for a carrier frequency of 80 MHz in practice if its high frequency pickup is disposed on the vehicle body at a position spaced apart from the marginal edge thereof within a range of distance equal to 4.5 cm.

From results of the computer simulation and experiments, it is recognized that such a range of distance depends on the level of the carrier frequency in an inverse proportional relation therebetween.

Thus, the present invention can be defined that a good reception can be obtained for each of various carrier frequencies if the distance of a high frequency pickup from the marginal portion of a metallic panel on the vehicle body is within a range:

$$12 \times 10^{-3} c/f (m)$$

where c is the velocity of light and f is the carrier frequency.

Briefly, the antenna system of the present invention will exhibit good reception if its high frequency pickup is disposed on the vehicle body near the marginal portion thereof within the aforementioned range of distance.

For a carrier frequency equal to 100 MHz, the high frequency pickup is preferably disposed spaced from the marginal portion of the vehicle body within a distance equal to 3.6 cm. As the carrier frequency f increases, the high frequency pickup should be disposed on the vehicle body at a location closer to the marginal portion thereof.

Where high frequency pickups are respectively located near the marginal portions of the vehicle body to receive broadcast waves as described hereinbefore, the high frequency pickups will have directional antenna patterns different from one another.

The present invention is further characterized in that such high frequency pickups having different directional patterns are combined with a diversity receiving system to effectively receive broadcast waves under all traveling conditions. To this end, a diversity type antenna system according to the present invention comprises a first high frequency pickup disposed on the vehicle body at one trunk hinge along the length thereof and a second high frequency pickup disposed on the vehicle body near the marginal edge of the roof preferably on the same side as said one trunk hinge.

EMBODIMENT

Figure 1:
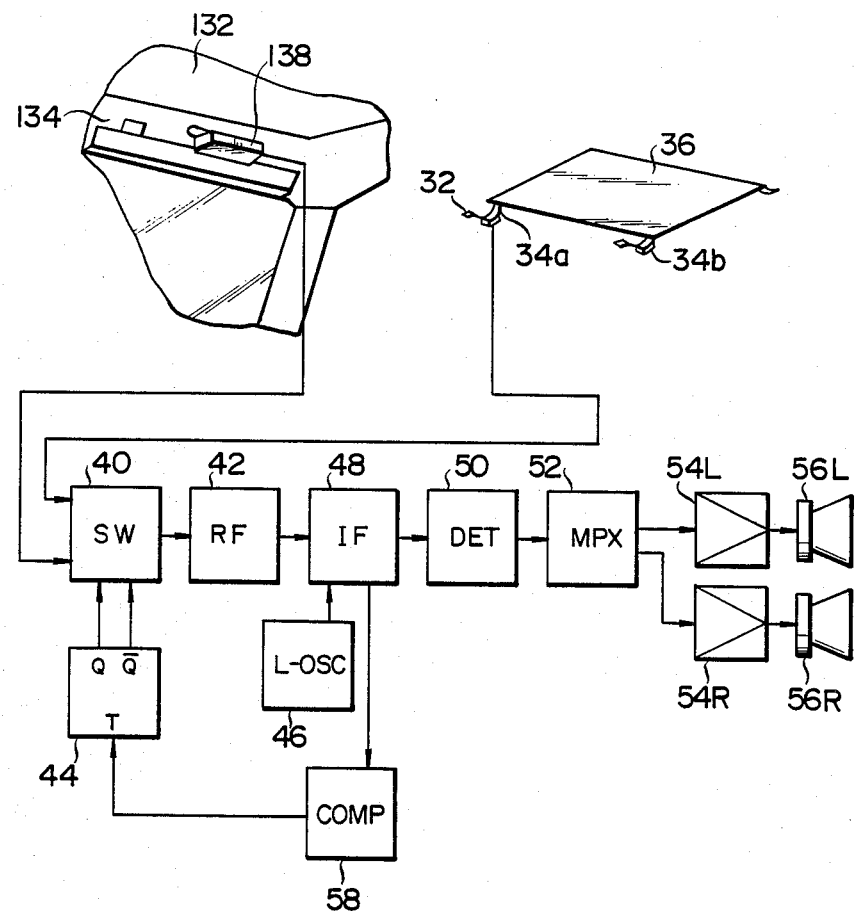
FIG. 1 illustrates a preferred embodiment of a vehicle antenna system constructed in accordance with the present invention.

Referring now to FIG. 1, there is shown a preferred embodiment of an antenna system according to the present invention characterized by a first high frequency pickup 32 disposed on the vehicle body at a right-hand trunk hinge 34a along the length thereof and a second high frequency pickup 138 disposed on the vehicle body near the right-hand marginal edge of the front roof 132 along the length thereof.

Figure 2:
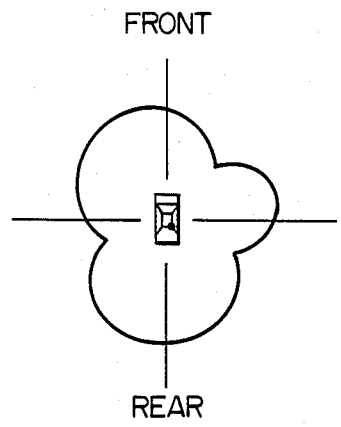
FIGS. 2 and 3 illustrate FM directional patterns of the high frequency pickups used in the antenna system shown in FIG. 1.

FIG. 2 shows the FM directional patterns of the first high frequency pickup 32 mounted on the right-hand trunk hinge 34a. It is apparent from this figure that the first high frequency pickup 32 has dips at the rightward and forward position and at the lateral position.

Figure 3:
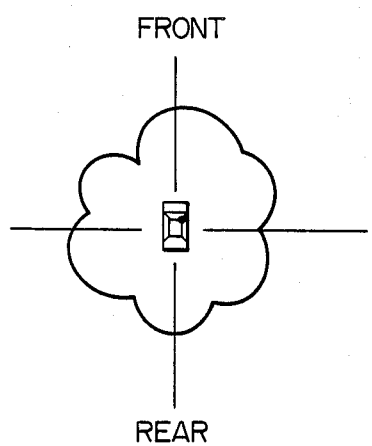

FIG. 3 shows the FM directional pattern of the second high frequency pickup 138 disposed near the right-hand marginal edge of the front roof 132. It is apparent from this figure that the second high frequency pickup 138 has a high sensitivity for the dip directions of the first high frequency pickup 32.

Thus, by combining the first and second high frequency pickups 32 and 138 with a diversity receiving system, the first and second pickups can complement each other with respect to their directional patterns to provide good reception of FM waves.

The first and second high frequency pickups 32 and 138 are spaced apart from each other by a distance equal to about 2 meters in the longitudinal direction of the vehicle body. This is very effective in a space diversity antenna system for FM bands since the wavelength of FM waves is equal to about 4 meters.

Although the embodiment shown in FIG. 1 has been described as to the right-hand portion of the vehicle body on which the first and second high frequency pickups 32 and 138 are mounted, these pickups may similarly be mounted on the left-hand trunk hinge and the left-hand roof portion of the vehicle body, respectively. In such a case, the first and second high frequency pickups 32 and 138 will have directional patterns completely inversed from those of FIGS. 2 and 3 in the right-to-left direction. However, the first and second pickups 32 and 138 will similarly complement each other with respect to their direction patterns to provide an improved space diversity receiving antenna system.

With reference to FIG. 1, there will now be described a circuit for automatically selecting one of the first and second high frequency pickups 32 and 138 which can more sensitively receive broadcast waves.

The outputs of the first and second high frequency pickups 32 and 138 are connected with a high frequency amplifying circuit 42 through coaxial cables via a switch circuit 40. The switch circuit 40 is actuated by the output of a T-type flip flop 44 to selectively connect one of the high frequency pickups 32 or 138 with the high frequency amplifying circuit 42. The output of the amplifying circuit 42 is supplied to a detection circuit 50 through an intermediate frequency amplifying circuit 48 which is connected with a local oscillator 46. At the detection circuit 50, only voice signals are taken out from the output signals of the high frequency amplifying circuit 42.

The voice signals are then separated into right-hand output signals and left-hand output signals by a multiplexer 52. The right- and left-hand output signals are reproduced at right- and left-hand speakers 56R and 56L through right- and left-hand amplifiers 54R and 54L, respectively.

The output signals from the intermediate frequency amplifier 48 are compared with its threshold set in a comparator 58. If the output level of the amplifier 48 is lower than the threshold to indicate that the sensitivity in either of the high frequency pickup 32 or 138 decreases beyond a predetermined level, the comparator 58 generates a trigger output used to invert the output of the T-type flip flop 44.

When the output of the flip flop 44 is inverted, the switch circuit 40 is shifted to select one of the high frequency pickups 32 or 138 which can more sensitively receive broadcast waves.

In such a manner, a space diversity receiving antenna system will be defined by the first high frequency pickup 32 on the trunk hinge 34a of the vehicle body and the second high frequency pickup 138 on the marginal portion of the front roof, the first and second pickups complementing each other with respect to their directional patterns to always provide the automatically selected antenna having good sensitivity.

First High Frequency Pickup

Figure 4:
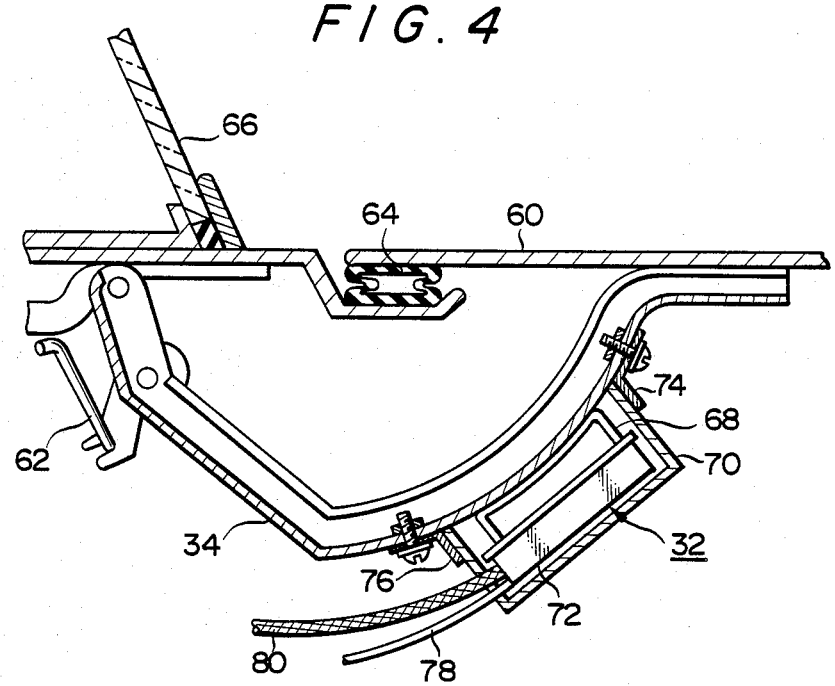
FIG. 4 is a cross-sectional view showing an electromagnetic coupling type loop antenna used as a first high frequency pickup which is mounted on a trunk hinge.
Figure 5:
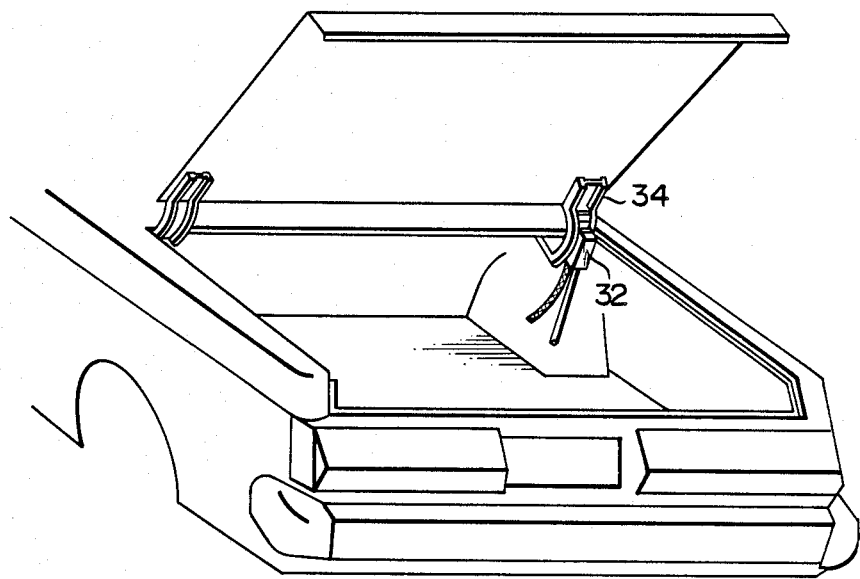
FIG. 5 is a perspective view of the trunk hinge on which the pickup of FIG. 4 is mounted.
Figure 6:
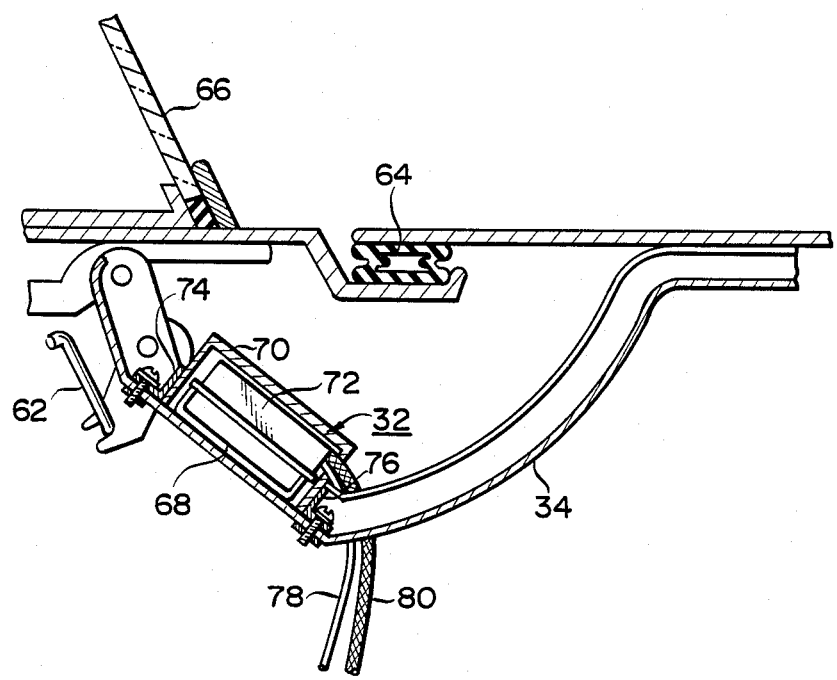
FIG. 6 is a cross-sectional view showing the pickup which is mounted on the trunk hinge in another manner.

FIGS. 4-6 illustrate the details of the first high frequency pickup 32 mounted on the trunk hinge 32a. Generally, surface currents are concentratedly induced on the trunk hinges by broadcast waves having a frequency belonging to FM bands with a density equal to or higher than those of other vehicle parts. This density is increased as the level of the frequency increases. Accordingly, surface currents can unexpectedly be detected from the trunk hinges which were not recognized to have surface currents sufficient to be detected for broadcast waves belonging to AM bands. The trunk hinges are advantageous in that since they are remote from the engine, they are difficult to be adversely affected by noises from the vehicle body. Therefore, the surface currents detected at the trunk hinges have a superior S/N ratio.

The high frequency pickup 32 is in the form of an electromagnetic coupling type pickup which has a construction similar to the aforementioned probe including the loop coil for determining the distribution of surface currents on the vehicle body.

The trunk hinge 34 is pivotally mounted at one end on the vehicle body with the other end thereof rigidly mounted on a trunk lid 60 to provide a pivot point for the trunk lid 60. The end of the trunk hinge 34 mounted on the vehicle body is provided with a torsion bar 62 which functions to position and hold the trunk lid 60 at its open state. As is well-known in the art, a water-tight weather strip 64 is located between the trunk lid 60 and the vehicle body to prevent external water from entering the interior of the trunk through the margin of a rear window glass 66.

In the illustrated embodiment, the first high frequency pickup 32 is mounted on the outer or trunk-room side of the trunk hinge 34 and extends along the length of that trunk hinge. The first high frequency pickup 32 includes a loop antenna 68 mounted therein and which is located with its length extending along the length of the trunk hinge 34. As was described hereinbefore, the loop antenna 68 can positively and efficiently catch the surface currents flowing on the trunk hinge 34.

The first high frequency pickup 32 further comprises a casing 70 of a conductive material within which the loop antenna 68 and circuitry including a pre-amplifier and others are mounted. The casing 70 is provided with an opening facing the trunk hinge 34. The opening side of the casing 70 includes L-shaped fittings 74 and 76 rigidly connected therewith at the opposite ends. Each of the fittings 74 and 76 is rigidly mounted on the trunk hinge 34 by suitable screws. Thus, only a magnetic flux induced by the surface high frequency currents flowing on the trunk hinge 34 will be detected by the loop antenna 68 without any interference from other external fluxes.

The loop antenna 68 extends along the length of the trunk hinge 34 and may preferably be curved to the curvature of the trunk hinge 34.

The circuitry 72 is connected with a power supply and receives control signals through a cable 78. High frequency signals detected by the loop antenna 68 are taken out through a coaxial cable 80 and then processed by a circuit similar to that used in the aforementioned probe for determining the distribution of surface currents.

The loop antenna 68 is in the form of a single electrically insulated winding which is in contact with the trunk hinge 34. Thus, the loop antenna 68 can intersect the magnetic flux induced by the surface currents on the trunk hinge 34.

In such a manner, the present invention provides a very advantageous vehicle antenna system which can positively receive broadcast waves belonging to high frequency bands without external exposure.

FIG. 6 shows another way of mounting the first high frequency pickup 32 on the trunk hinge 34. This is substantially the same way as that of FIG. 4 except that the high frequency pickup is mounted on the inner side of the trunk hinge 34. The first high frequency pickup 32 is similarly of an electromagnetic coupling type and includes a casing 70 within which a loop antenna 68 and associated circuitry 72 are mounted. The casing 70 is similarly rigidly mounted on the trunk hinge 34 through L-shaped fittings 74 and 76 by any suitable screw means.

In such an arrangement, the first high frequency pickup 32 will not contact baggage and other items housed in the trunk room since the pickup 32 is mounted on the side of the trunk hinge 34 opposite to the trunk room.

Second High Frequency Pickup

Figure 7:
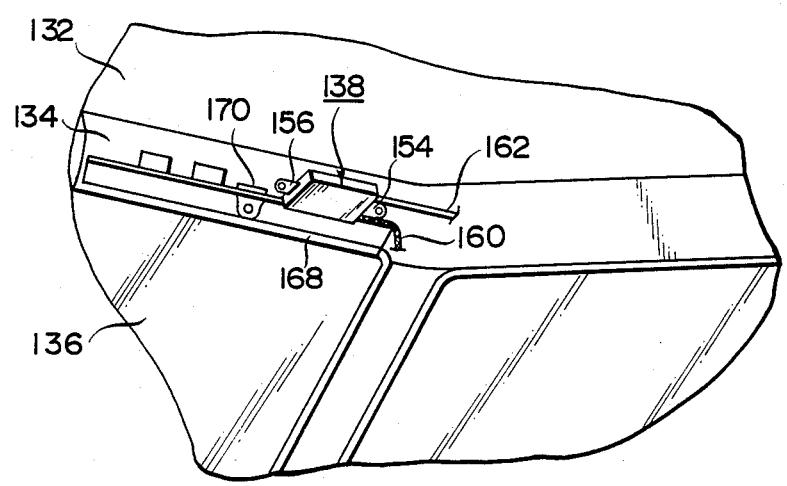
FIG. 7 is a perspective view showing an electromagnetic coupling type high frequency pickup used as a second high frequency pickup which is mounted on the front margin of a vehicle roof.
Figure 8:
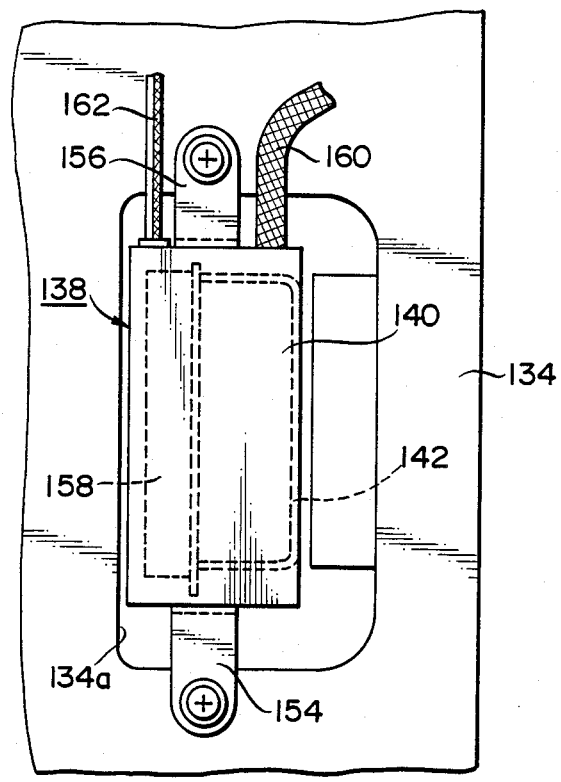
FIG. 8 is a plan view of the pickup shown in FIG. 7.
Figure 9:
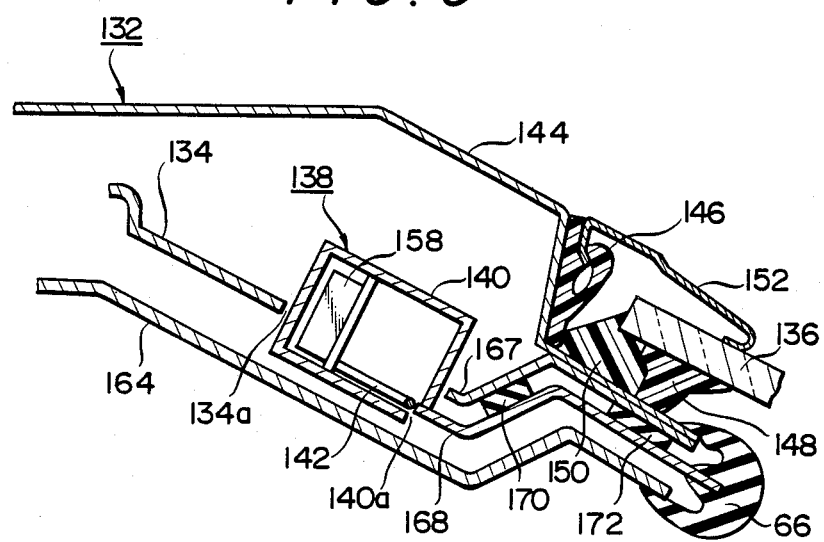
FIG. 9 is a cross-sectional view showing the details of the pickup mounted on the vehicle roof as shown in FIGS. 6 and 7.

Referring next to FIGS. 7-9, there is shown a second high frequency pickup 138 disposed near the margin of the front vehicle roof. FIG. 7 shows the front roof 132 of a metallic material in its naked state, which roof includes a front window frame 134 connected with a front window glass 136 to define a marginal edge portion of the front roof 132.

FIG. 8 shows the details of the second high frequency pickup 138 which includes a metallic casing 140 for shielding any external flux and a loop antenna 142 mounted therewithin, with these components defining an electromagnetic coupling type pickup similar to the aforementioned probe used to determine the distribution of surface currents on the vehicle body.

FIG. 9 is a cross sectional view of the second high frequency pickup 138 mounted on the front roof 132 which includes a roof panel 144. The front window frame 134 is joined to the roof panel 144 at its one edge. The roof panel 144 also supports the front window glass 136 through a fastener 146 and a dam 148. The fastener and dam 146, 148 are air-tightly joined together through an adhesive 150. A molding 152 is rigidly mounted between the roof panel 144 and the front window glass 136.

A roof garnish 164 is rigidly mounted on the roof panel 144 inwardly of the front window frame 134 of the front roof 132 (passenger room side). The roof garnish 164 is connected at one edge with the corresponding edge of the front window frame 134 through an edge molding 166.

An edge molding mounting retainer 168 is disposed between the front window frame 134 and the roof garnish 164 to support the edge molding 166. The retainer 168 is separated from the front window frame 134 by means of spacers 170 and 172.

The loop antenna 142 of the second high frequency pickup 138 is disposed facing the marginal portion of the retainer 168. To this end, the front window frame 134 is provided with an opening 134a in which the casing 140 of the pickup 138 is located.

In such a manner, the second high frequency pickup 138 will have its loop antenna 142 disposed near the marginal portion of the retainer 168 and extending along the length thereof.

The length of the retainer 168 is preselected to be equal to about a half-wavelength of the broadcast waves belonging to FM bands.

As seen from FIG. 9, the casing 140 of the pickup 138 is provided with an opening 140a in which one longitudinal side of the loop antenna 142 is positioned to face the marginal portion of the retainer 168 through the opening 140a.

Within the interior of the casing 140, the loop antenna 142 can positively catch a magnetic flux induced by the surface currents flowing on the marginal portion of the retainer 168. Any other external flux can positively be blocked by the metallic casing 140. Thus, the second high frequency pickup 138 can more sensitively detect the surface currents induced on the vehicle body by the broadcast waves.

The casing 140 includes L-shaped brackets 154 and 156 formed thereon at the opposite ends such that the pickup 138 can positively be positioned relative to the retainer 168, as shown in FIG. 8. The brackets 154 and 156 are rigidly secured to the front window frame 134 by any suitable fastening means such as screws.

The casing 146 of the pickup 138 contains circuitry 158 connected with the loop antenna 142 and which includes a pre-amplifier and other components for processing detected signals. High frequency signals detected by the loop antenna 142 are taken out through a coaxial cable 160 and then processed by a circuit similar to that used in the aforementioned probe for measuring the distribution of surface currents. The circuitry 158 is connected with a power supply and receives control signals through a cable 162.

The loop antenna 142 is in the form of a single electrically insulated winding which is arranged in contact with the retainer 168. As a result, the loop antenna 142 can more sensitively detect a magnetic flux induced by the surface currents on the retainer 168.

In the present embodiment, the exposed side of the loop antenna 142 through the opening of the casing 140 is located apart from the margin of the retainer 168 within a range of 4.5 cm. Thus, the loop antenna 142 can positively detect broadcast waves belonging radio frequency bands (particularly, 50 MHz–300 MHz) from the surface currents flowing on the marginal portion of the retainer 168. As seen from FIG. 23, the orientation of the flowing surface currents is along the marginal portions of the vehicle body. Therefore, the loop antenna 146 is located so that the length thereof extends along the marginal edge of the retainer 168.

Although the embodiments of the present invention have been described as to the electromagnetic coupling type pickup, the present invention may similarly be applied to an electrostatic coupling type pickup as long as it can detect external waves through the detection of surface currents on the trunk hinges and the marginal portion of the roof, which locations were expected to receive broadcast waves efficiently in the prior art.

When electrostatic coupling type pickups are used according to the present invention, detecting electrodes are disposed on and along the corresponding trunk hinge and front roof margin through air gaps or insulating sheets to form electrostatic capacities therebetween, respectively. Surface currents will be taken out by the detecting electrodes and then converted into audible signals in any suitable manner.

Roof High Frequency Pickup

Figure 10:
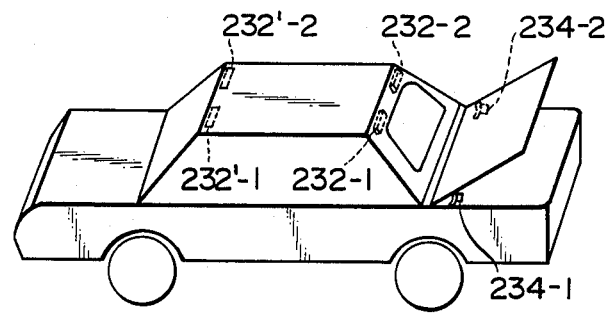
FIG. 10 is a perspective view of the entire vehicle body, showing another arrangement of roof and trunk-hinge pickups mounted on the vehicle body.

Referring to FIG. 10, there is shown the entire arrangement of a diversity antenna comprising two high frequency pickups 232-1 and 232-2 mounted on the rearward edge of the roof of the vehicle body and two high frequency pickups 234-1 and 234-2 mounted on the trunk hinges of the vehicle body. The roof pickups may be disposed on the forward edge of the vehicle roof as shown by 232'-1 and 232'-2 in FIG. 10.

Figure 11:
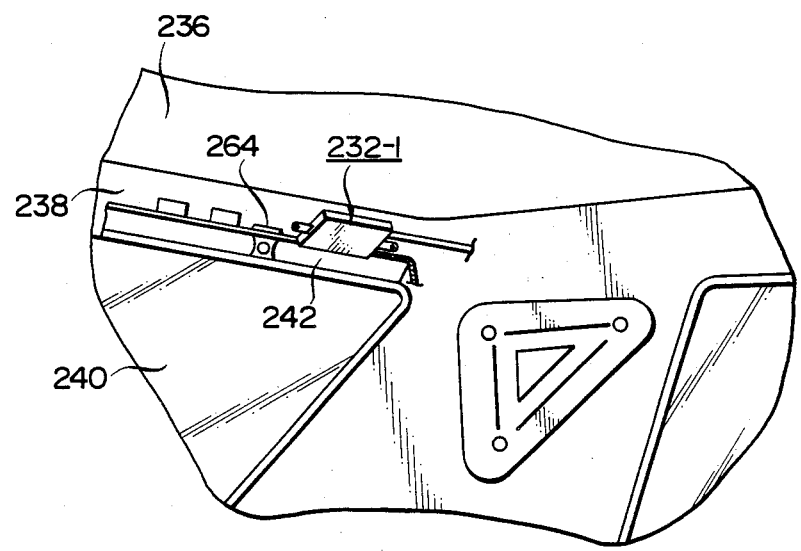
FIG. 11 is a perspective view of a roof high frequency pickup defining a diversity antenna which is mounted on the roof panel near the rear window.

FIG. 11 shows the roof pickup 232-1 mounted on the vehicle roof along the edge of the rear window. The roof panel 236 is shown in its naked state and as being connected with a rear window glass 240 through a rear window frame 238.

The roof high frequency pickups 232-1 and 232-2 are disposed on the vehicle roof at the opposite ends of an edge molding mounting retainer 242, respectively. These pickups 232 are mounted on the vehicle roof in the same manner as shown in FIG. 9.

As in the previously described embodiments, the retainer 242 is disposed between the rear window frame 238 and a roof garnish (not shown) to support an edge molding (not shown). The retainer 242 is separated from the rear window frame 238 by spacers (not shown) such that the surface currents can more concentratedly be induced on the retainer 242.

Figure 12:
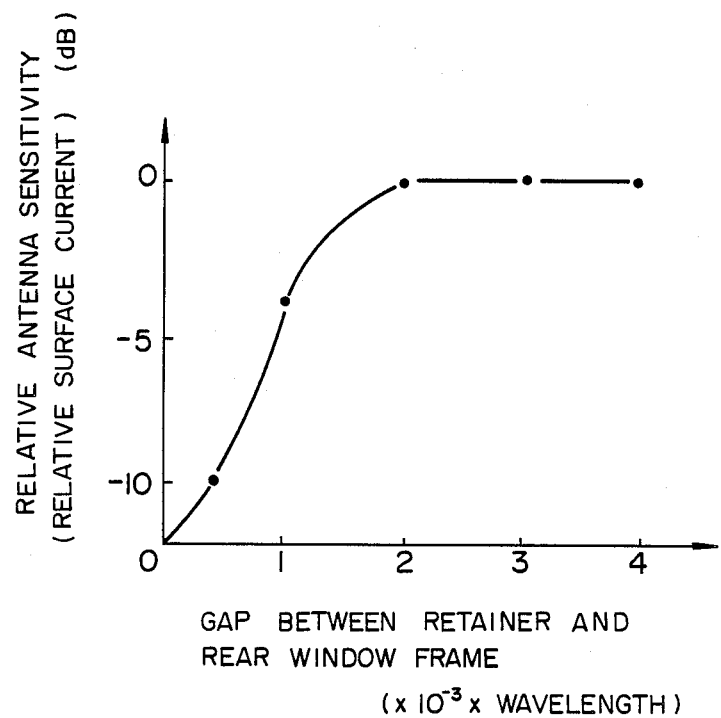
FIG. 12 is a graph illustrating changes of the antenna sensitivity relative to variable gap between the rear window frame and the retainer.

A variable antenna sensitivity depending on the spacing between the rear window frame 238 and the retainer 242 is shown as a variable density of surface current in FIG. 12. Fron this graph, it will be apparent that the antenna sensitivity becomes maximum at a spacing equal to about $2 \times 10^{-3} \times$ wavelength. Thus, the surface currents can more concentratedly be induced on the marginal portion of the vehicle body if the retainer 242 is disposed spaced apart from the rear window frame 238 by such a spacing.

In such a manner, the roof high frequency pickup 232 can efficiently detect the surface currents induced on the vehicle body. Since the retainer is spaced apart from the rear window frame by the spacing of about $2 \times 10^{-3} \times$ wavelength and the length of the retainer is preselected to be about a half-wavelength for TV waves belonging to bands of 90 MHz–108 MHz, to be about one wavelength for waves belonging to bands of 170 MHz–222 MHz and to be about two to four wavelengths for UHF bands, the surface currents will much more concentratedly be induced so that the broadcast waves belonging to the above bands can more sensitively be received.

Figure 13:
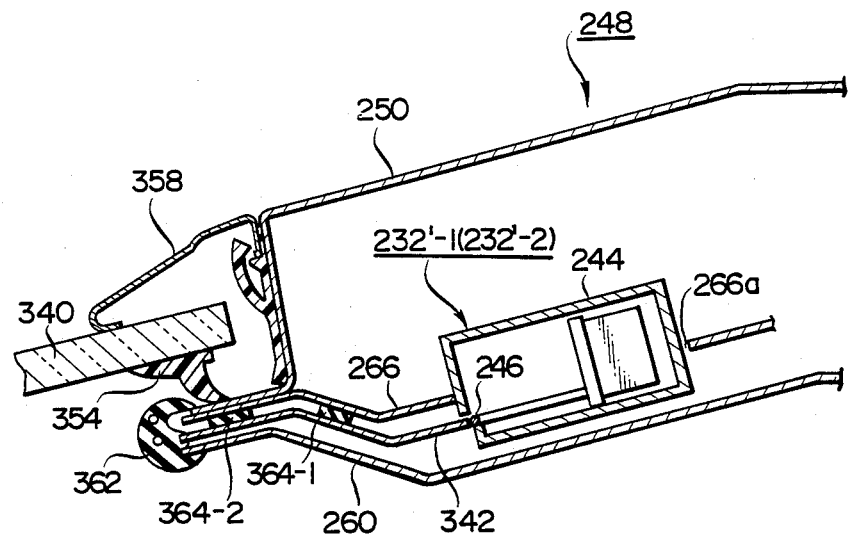
FIG. 13 is a cross-sectional view of a roof high frequency pickup which is mounted on the roof panel near the front window.

The roof high frequency pickups 232 may be disposed on the vehicle roof near the front window. FIG. 13 shows high frequency pickups 232'-1 and 232'-2 mounted on the front roof panel 248 near the front window. These roof high frequency pickups 232' are located within a service hole 266a formed in an inner header panel 266 adjacent to the marginal edge of the front window.

The roof panel 248 includes a roof panel section 250 on which a front window glass 340 is rigidly mounted through a dam 354. A molding 358 is connected between the roof panel section 250 and the front window glass 340. As in the roof high frequency pickups 232 adjacent to the rear window, an edge molding mounting retainer 342 is arranged between the inner header panel 266 and a roof garnish 260 to support an edge molding 362.

The retainer 342 is separated from the inner header panel 266 by spacers 364-1 and 364-2 such that the surface currents will more concentratedly be induced on the retainer 342.

A magnetic flux induced by the surface high frequency currents flowing on the marginal portion of the inner header panel 266 can positively be detected by a loop antenna 264 of the high frequency pickup 232' including a casing 244 within which the loop antenna 246 is mounted as described hereinbefore and which can positively shield any external flux of electromagnetic waves.

In the embodiment of FIG. 13, the loop antenna 246 of each of the high frequency pickups 232' is partially exposed through the casing 244 with the exposed antenna part being spaced apart from the marginal portion of the retainer 342 within a range of 4.5 cm. The loop antenna 246 can efficiently detect the surface currents induced on the marginal portion of the retainer 342 by broadcast waves having a frequency belonging to FM or TV bands. As seen from FIG. 23, the orientation of the induced surface currents is along the marginal portion of the retainer. Therefore, the loop antenna 246 is arranged with the length thereof extending along the marginal edge of the retainer 342.

Trunk Hinge High Frequency Pickup

In order to complement the directional pattern of the roof high frequency pickups 232, other high frequency pickups are arranged on the trunk hinges. Surface currents having a density equal to or higher than those of the other vehicle parts are induced on the trunk hinges. Such a tendency is increased for broadcast waves having higher frequencies. Thus, the surface currents can be detected from the trunk hinges which was not expected for AM bands.

Since the trunk hinges are remote from the engine, surface currents detected therefrom have less noise and thus have a superior S/N ratio.

Figure 14:
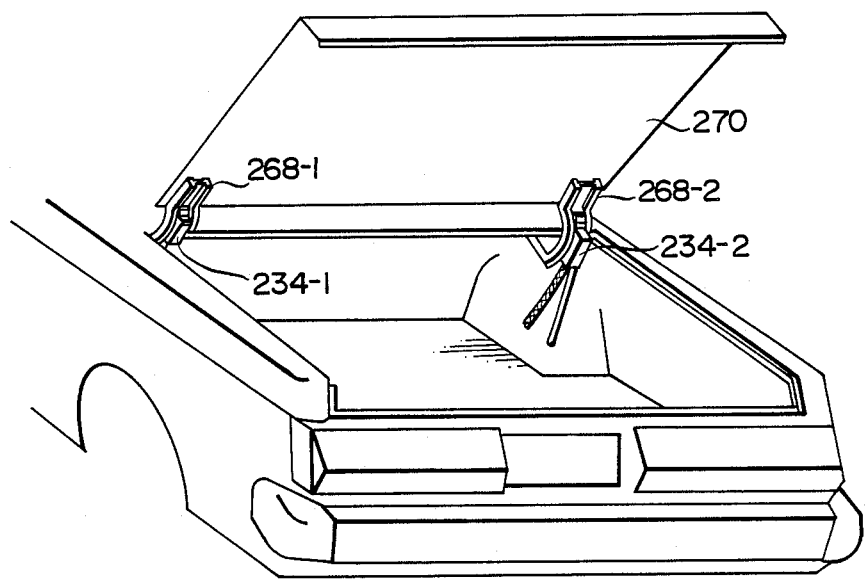
FIG. 14 is a perspective view showing high frequency pickups which are mounted on two trunk hinges.

FIG. 14 shows the above high frequency pickups mounted on the trunk hinges of the vehicle body with the details thereof already shown in FIG. 4. Each of the trunk hinge high frequency pickups 234 is shown as being of an electromagnetic coupling type which includes a loop antenna for detecting the surface currents induced on the corresponding trunk hinge as in the roof high frequency pickups 232. The construction of these trunk hinges is similar to those of the trunk hinge previously described. Similarly, each trunk hinge high frequency pickup may be mounted on the corresponding trunk hinge at the inner side thereof rather than the outer side. As a result, the high frequency pickup will not contact baggage or other items housed in the trunk room.

In such a manner, the present invention can provide a vehicle antenna system which comprises a combination of the roof pickups 232 with the trunk hinge pickups 234 such that the directional patterns of the roof and hinge pickups will be complemented by each other to provide an improved directional pattern.

Reception of Broadcast Waves

Figure 15:
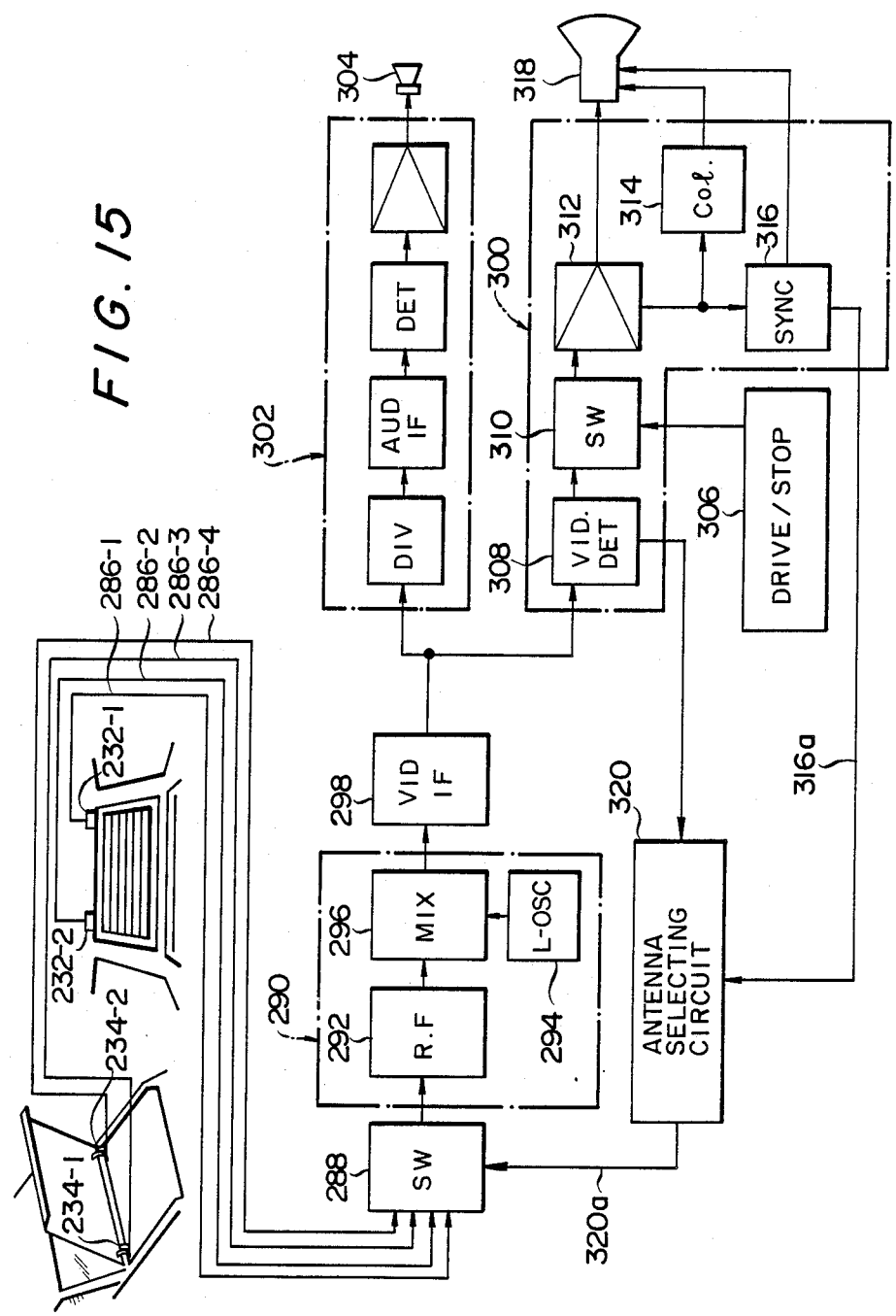
FIG. 15 is a block diagram of a diversity control according to the present invention.

Referring now to FIG. 15, there is shown a switching circuit 288 which is adapted to receive the respective signals from the roof high frequency pickups 232-1 and 232-2 and from the trunk hinge high frequency pickups 234-1 and 234-2 through coaxial cables 286-1–286-4, respectively.

In the embodiment of FIG. 15, each of the high frequency pickups 232 and 234 is adapted to receive TV waves and selected by the actuation of the switching circuit 288. The switching circuit 288 is actuated to select signals from one of the pickups and to supply them to a tuner 290.

The tuner 290 comprises a well-known circuit including a high frequency amplifier 292, a local oscillator 294 and a mixer 296. Signals selected by the tuner 290 are then amplified by an intermediate frequency image amplifier 298 with the amplified signals being supplied to an image display circuit 300 and a voice output circuit 302, respectively. The output of the voice output circuit 302 is coupled with a speaker 304.

The image display circuit 300 comprises a drive state discriminating circuit 306 for judging whether a vehicle is in its stop or drive state, and a switch 310 located between an image detection circuit 308 and an image amplifier 312 to selectively block the communication therebetween. When the drive state discriminating circuit 306 senses the stop state of the vehicle, the switch 310 is turned on. On the drive state of the vehicle, the switch 310 is turned off.

As shown in FIG. 16, the drive state discriminating circuit 306 is adapted to judge the stop state of the vehicle when a parking position switch and a parking brake are placed on their ON positions and if the velocity of the vehicle is lower than a predetermined reference level. The drive state discriminating circuit 306 also comprises and AND gate generating high-level output signals which in turn are used to actuate the switch 310. Under conditions other than the above conditions, the discriminating circuit 306 judges the vehicle at its running state and then causes the AND gate to generate low-level output signals which in turn are used to shift the switch 310 to its OFF state. The drive state discriminating circuit 306 further comprises a high pass filter and a comparator. Pulses indicative of the vehicle velocity are supplied to the comparator through the high pass filter wherein the pulses are compared with a reference level to judge the velocity of the vehicle.

When the switch 310 is in its ON state under the stop state of the vehicle, images are displayed on a Broun tube 318 and also voices are outputted from the speaker 304. When the switch 310 is in its OFF state under the vehicle stop state, no image can be displayed on the Broun tube 318 and only voices are outputted from the speaker 304.

In order that excellent images and voices can always be obtained following a variable reception of TV waves even when the vehicle is running, the present invention provides a diversity receiving system for selecting one of the pickups 332 and 334 depending on the variable reception of TV waves.

If the output of the image detection circuit 308 becomes lower than a preselected level, an antenna switching circuit 320 then generates a switching output signal 320a which in turn is supplied to the switching circuit 288 which in turn selects one of the pickups having the most sensitivity at that time. Such selection may be carried out by utilizing voice detection output signals.

The timing of the antenna switching may be in synchronism with a vertical synchronizing signal such that the pickups will be switched from one to another during a flyback term of scanning lines. The circuitry of FIG. 15 further comprises a chromaticity circuit 314 and a synchronizing and deflecting circuit 316.

In such a manner, the antenna system of the present invention can select a high frequency pickup having an optimum sensitivity such that the optimum reception of TV waves can always be made by the antenna system. The antenna system can further be improved by providing high frequency pickups respectively mounted on the roof and trunk hinge of the vehicle body such that their directional patterns can be complemented by each other.

FIG. 17A shows the directional pattern of a roof high frequency pickup mounted on the vehicle roof adjacent to the rear window frame while FIG. 17B shows the directional patterns of a high frequency pickup mounted on one of the trunk hinges of the vehicle.

As will be apparent from FIGS. 17A and 17B, the characteristic curve a of the roof pickup 232 indicates the fact that the sensitivity is increased in a direction across the vehicle body. On the contrary, the characteristic curve b of the trunk hinge pickup shows that the sensitivity is increased in a direction along the longitudinal axis of the vehicle body. It is thus understood that the high frequency pickups can be complemented by each other in sensitivity by effecting the diversity reception based on these pickups. As a result, the reception of TV waves can be highly improved.

It is clearly understood from the foregoing that the present invention provides a diversity receiving antenna system consisting of high frequency pickups which are respectively mounted on the roof and trunk hinges of the vehicle and thus have different directional patterns. Such a diversity receiving antenna system can receive broadcast wave with largely improved directional patterns and with less multi-path noises. In addition, the diversity receiving antenna system desirably includes no outwardly extending antenna since it is adapted to receive broadcast waves from surface currents induced on the vehicle body by the broadcast waves.

We claim:

1. A diversity type vehicle antenna system for detecting broadcast waves, comprising:

first high frequency pickup means including a loop antenna mounted adjacent and in close proximity to a marginal edge portion of a vehicle roof of the vehicle body for electromagnetically detecting a magnetic flux formed by surface high-frequency currents flowing on the vehicle roof induced by the broadcast waves;

second high frequency pickup means including a loop antenna rigidly mounted on and along a trunk hinge of the vehicle body, said loop antenna being adapted to electromagnetically detect a magnetic flux formed by surface high-frequency currents flowing on the trunk hinge induced by the broadcast waves; and pickup selection means for switchably selecting an output from any one of said first and second high-frequency pickup means, said pickup selection means comparing the selected output to a predetermined threshold limit and switching to the other output of said first and second high frequency pickup means when the selected output is lower than the predetermined threshold.

2. A diversity type vehicle antenna system as defined in claim 1, said loop antenna of said first high frequency pickup means being disposed adjacent and in close proximity to a marginal portion of the front roof of the vehicle.

3. A diversity type vehicle antenna system as defined in claim 2, said first and second high frequency pickup means being located on the same side of the vehicle body.

4. A diversity type vehicle antenna system as defined in any one of claim 1, 2 or 3, said loop antenna of said first high frequency pickup means being mounted on the interior side of the front roof of the vehicle, spaced apart from the front window frame of the vehicle, along the marginal portion of an edge molding mounting retainer, having a length substantially equal to a half-wavelength of a frequency of the broadcast waves to be received.

5. A diversity type vehicle antenna system as defined in claim 1, further comprising an edge molding mounting retainer having a length such that the surface currents flowing thereon easily resonate with a frequency equal to or higher than 50 MHz and being disposed on the vehicle body at a location spaced apart from the marginal edge portion of the vehicle roof on which the surface currents flow, by a distance equal to about $$2 \times 10^{-3} \times \text{wavelength}$$

to increase the concentration of the surface currents on said edge molding mounting retainer, said loop antenna of said first high frequency pickup means being disposed along said edge molding mounting retainer.

6. A diversity type vehicle antenna system as defined in claim 5, said loop antenna of said first high frequency pickup means being disposed adjacent and in close proximity to a rear window frame.

7. A diversity type vehicle antenna system as defined in claim 5, said loop antenna of said first high frequency pickup means being disposed adjacent and in close proximity to a front window frame.

8. A diversity type vehicle antenna system as defined in any one of claims 5, 6 or 7 wherein two pairs of said first and second high frequency pickup means are provided, one pair on each side of the vehicle body.

* * * * *